Nov. 11, 1924.
E. G. KESLING
1,514,665
METHOD OF ASCERTAINING THE ACTINIC VALUE OF LIGHT FOR PHOTOGRAPHIC PURPOSES
Filed July 17, 1920
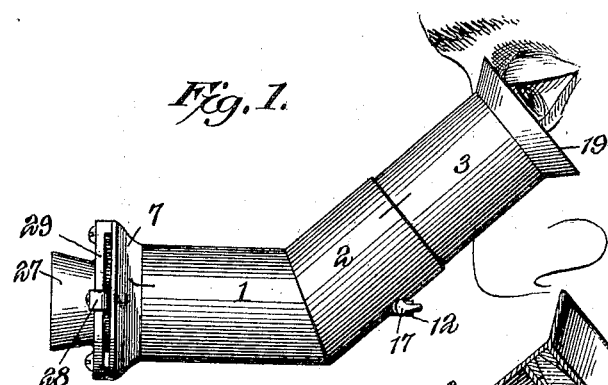
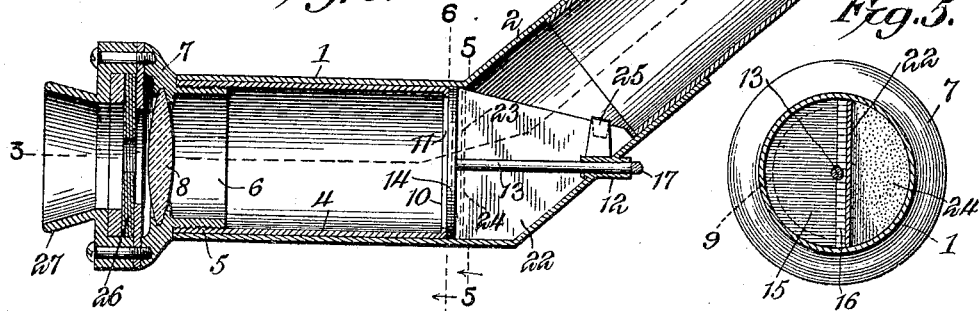
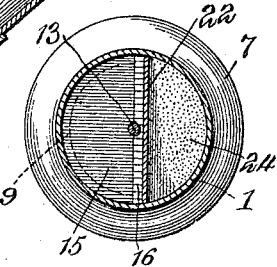
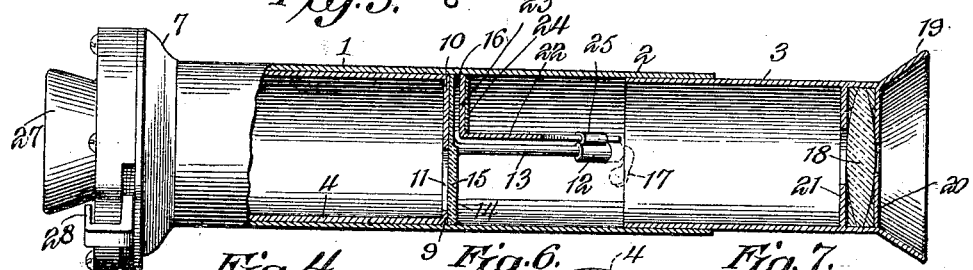
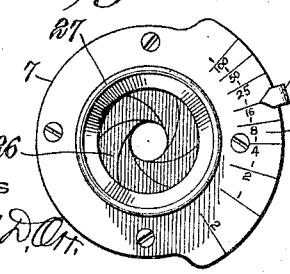
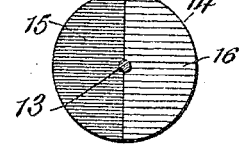
Elmer G. Kesling, INVENTOR,
WITNESSES
BY
ATTORNEY Patented Nov. 11, 1924.

1,514,665

UNITED STATES PATENT OFFICE.

ELMER G. KESLING, OF BLOOMFIELD, MISSOURI.

METHOD OF ASCERTAINING THE ACTINIC VALUE OF LIGHT FOR PHOTOGRAPHIC PURPOSES.

Application filed July 17, 1929. Serial No. 396,921.

*To all whom it may concern:*

Be it known that I, ELMER G. KESLING, citizen of the United States, residing at Bloomfield, in the county of Stoddard and State of Missouri, have invented new and useful Methods of Ascertaining the Actinic Value of Light for Photographic Purposes, of which the following is a specification.

This invention has reference to the method of ascertaining the actinic value of light for photographic purposes and its object is to both ascertain such actinic value by a comparison of the image with a light source of fixed value and to provide an instrument whereby the actinic value may be readily ascertained in order to indicate the proper setting of the camera.

In accordance with the invention provision is made for projecting an image of the scene about to be photographed upon a screen or background with the line of vision of the image so produced at an angle to the axis of the image on to the screen, whereby the image on the screen may be viewed out of line with the source of light and at the same time the viewed image may be compared with another source of light of constant value. By modifying the intensity of the image of the view to be photographed until such intensity shall agree with the source of light of constant intensity, or shall be brought to a chosen comparative intensity, and by providing means whereby the adjustment of the parts to produce the desired intensity may be indicated, the proper setting for the light controlling parts of the camera are shown.

In the apparatus constructed in accordance with the invention, which is not herein claimed, there is provided a small camera-like structure having an adjustable diaphragm, preferably of the iris diaphragm form; and the image may be produced, in conjunction with the diaphragm, by a simple lens throwing the image of the scene or object to be photographed upon a light transmitting screen having a plurality of transmitting portions of different light transmitting values. Associated with such a screen so as to be readily utilized for comparison purposes, is a surface provided with self-luminous material such as one of the radium compounds.

Connected with the camera device is an eye piece comprising an appropriate tube with a lens, and the tube and lens are arranged at an angle to the longitudinal axis of the image producing part so that the line of sight of the image produced on the screen is out of line with the optical axis of the image producing part of the structure. This provides for a clear view of the image projected on to the screen within the structure and of the standardized light producing means, for comparison, so that no direct confusing view is obtained of any high lights which may appear in the scene to be photographed and which might otherwise interfere with the correctness of the comparison.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is an elevation of an exposure meter embodying the invention.

Fig. 2 is a longitudinal section of the structure shown in Fig. 1 but drawn on a larger scale.

Fig. 3 is a longitudinal section on the line 3—3 of Fig. 2 with some parts shown in elevation.

Fig. 4 is an elevation of the diaphragm end of the exposure meter.

Fig. 5 is a section on the line 5—5 of Fig. 2.

Fig. 6 is a section on the line 6—6 of Fig. 2.

Fig. 7 is a face view of the image screen removed from the device.

Referring to the drawings, of which Fig. 1 is drawn at about natural size and the other figures are enlarged so as to be above natural size, there is shown a tubular casing member 1 having an extension 2 at one end at an angle to the longitudinal central axis of the main portion of the casing member 1. The extension 2 is provided with a section 3 telescoping in the extension 2 thus permitting a limited amount of longitudinal adjustment of the telescoping section 3 in the angle extension 2.

Within the portion of section 1 of the instrument there is a sleeve 4 serving as a reinforcing or stiffening sleeve and also for other purposes, and at the forward end the sleeve 4 has an internal screw threaded part 5 to receive an external screw threaded neck 6 on a head 7 in which there is mounted a lens 8 of appropriate character to project an image to the rear end of the sleeve 4 where the latter is provided with an inturned flange 9 for about half its circumference and a head 10 of about half of the cross sectional area of the sleeve, the remainder of the corresponding end of the sleeve having an opening 11 therethrough unobstructed by any portion of the sleeve.

In the angle extension 2 there is a bearing sleeve 12 in the longitudinal axis of the casing section 1, this bearing entering the interior of the casing and extending beyond the exterior thereof. Mounted in the sleeve 12 is a rock shaft 13 carrying a disk 14 capable of turning with the shaft 13 and lodged against the head 9 and 10 of the sleeve 4. The disk 14 is or may be formed of frosted celluloid or other translucent material with about one-half, indicated at 15, thicker than the other half, indicated at 16; and while not necessarily confined to any particular material is preferably made of celluloid of green tint, the difference in thickness of the two halves of the disk producing a corresponding difference in light transmitting power, for the density of the thicker portion is greater than that of the thinner portion.

The end of the shaft 13 beyond the extension 2 is provided with a manipulating handle 17 of appropriate form. The celluloid or other light transmitting disk, may be frosted or otherwise rendered translucent for use as a photographic screen so that an image may be projected thereon by the lens 8 so as to be readily observed by looking through the eye-piece lens 18 mounted in the tube 3, which latter, outside of the lens 18, has a flaring eye shade 19 to exclude extraneous light. Moreover, the eye-piece end of the tube 3 on opposite sides of the lens 18 is furnished with diaphragms 20, 21, serving to sharpen the image seen by the eye.

At one side of the shaft 13 the angle portion 2 of the body 1 contains a plate 22 dividing the field of view, as seen through the lens 18, into two parts. The division plate 22 has an angle end 23 hiding a portion, approximately one-half, of the disk 14 from view, and the angle extension 23 carries a sheet or coating 24 of self-luminous material of the radium type, as, for instance, a radium luminous material obtainable on the market under the trade name of "Undark". This particular material is suitable for the purposes of the invention since it has the property of remaining constantly luminous without the aid of external light and consequently furnishes a field of standard luminosity for comparison. The plate or wall 22 provides a division between the luminous sheet or wall 24 and a light image projected upon the screen 14 appearing on the other side of the wall 22 away from the luminous sheet or field 24. In order to hold the wall 22 in place the tube or bearing 12 is provided with a clip 25 bent over the wall 22.

The head 7 has secured to it an iris diaphragm 26 provided with the customary hood 27 permitting access of light to the iris diaphragm, but excluding stray rays of light, whereby to prevent glares. The moving parts of the iris diaphragm are controlled by a finger piece 28 in the customary manner. The iris diaphragm need not differ from such structures as are found on the market and hence requires no special description, the office of the iris diaphragm being to gradually vary at will the intensity of the light entering the body of the instrument and consequently the brilliancy and sharpness of the image projected by the lens 8 upon the field received upon the disk 14 and appearing within the margins of the opening 11.

The finger piece 28 is movable across a scale 29 properly calibrated.

When the instrument is used to indicate the time of exposure of a photo-sensitive surface the end of the instrument containing the lens 8 is pointed toward the scene to be photographed and adjusted so that the desired part of the scene becomes visible upon that part of the screen 14 opposite the opening 11. If the scene be particularly brilliant, the denser portion of the screen 14 is moved into the line of vision. If the light be dimmer then the thinner portion 16 of the screen is moved over the opening 11, by a suitable manipulation of the handle 17. Having located the part to be photographed the iris diaphragm 26 is adjusted by means of the finger piece 28, which also serves as a pointer, so that the brilliancy of the image is brought into conformity with the brilliancy of the light emanating from the radio-active material 24 on the side of the division wall or diaphragm 22 remote from the opening 11. Having brought the image of the scene to be photographed into agreement with the standard light emitted from the radio-active material, the instrument is removed from the eye and the number on the scale 29 opposite which the finger or pointer 28 is found is observed and this number will be found to be the time of exposure of the sensitive photograph surface to obtain a properly exposed negative.

The light emanating from the radio-active material is of a greenish blue tint and it is for this reason that the screen upon which the light image of the scene to be photographed is projected is given a similar tint, but with the different parts of different thicknesses to produce differences in density, whereby brilliant images are toned down in order that a brilliant image may appear as of the same intensity as the self-luminous field, or, in case of the light being poor, the image of the scene to be photographed may be brought into engagement with the self-luminous material without toning down.

If the line of sight from the eye lens 18 to the screen 14 and so on through to the field of the image forming lens 8, were a straight line of sight, then the opening through the diaphragm 26 would appear more brilliant than it should. However, by making the line of sight from the eye lens 18 to the screen opposite the opening 11 at an angle to the optical axis of the lens 8, the eye of the observer is out of line with the opening through the diaphragm 26, and the glare spot which would otherwise appear is not seen and consequently does not deceive the observer in comparing the image appearing on the screen opposite the opening 11 with the light image of the luminous material.

The time scale 29 is or may be proportioned to a chosen stop on the camera shutter, say stop No. 16, so that when it is determined that a certain time of exposure is necessary for the light available, it is an easy matter to calculate the amount of exposure necessary for larger or smaller stops.

The casing may be conveniently provided with tables for guiding the operator in the use of the instrument, but it is deemed unnecessary to illustrate such tables, for they may vary in accordance with the stops employed and with other conditions, and such tables may be readily worked out by the manufacturer.

The instrument with the exception of the lenses and luminous material, may be made of sheet metal finished in any desirable way. In use the luminous material provides a constant source of light for comparison with the image seen upon the screen 14, and such image may be brought into conformity with the luminosity of the luminous material by a variation in the diaphragm opening of the iris diaphragm 26, whereupon the position of the pointer 28 on the scale 29 will then indicate the time of exposure in the camera of the sensitive surface to the scene to be photographed. The necessary lengths of exposure for other stops than the one to which the instrument is standardized are readily ascertained.

What is claimed is:

1. The method of ascertaining the strength of light for photographic purposes, which consists in projecting an image of an object or scene upon a screen, comparing the image on the screen with a self-luminous surface of constant intensity located in proximity thereto, adjusting by means of a pointer working over a predetermined scale the illumination of the screen until the image of the object or scene to be photographed is brought into agreement with the self-luminous surface, and then noting upon the scale the indicated time of exposure of a photo-sensitive surface to the scene to be photographed.

2. The method of ascertaining the time of exposure of a photo-sensitive surface to a scene to be photographed, which consists in projecting an image of the scene upon a screen, comparing the image with a self-luminous surface of constant intensity, cutting down the illumination of the field upon the screen until equaling the luminosity of the luminous surface and finally noting on a predetermined scale of times of exposure the exposure time indicated by the adjustment of the luminosity of the image to that of the self-luminous surface.

3. The method of ascertaining the strength of light producing an image, which consists in projecting the image upon a surface, stopping down the light of the image until the image equals a given luminosity, with the image viewed at an angle to the optical axis of the image, and then noting upon a scale provided for the purpose the time of exposure of a sensitive surface in a camera, determined by the position of an indicator associated with the scale and moved in the act of stopping down the illumination of the image.

In testimony, that I claim the foregoing as my own, I have hereto affixed my signature.

ELMER G. KESLING.